(No Model.)
R. W. DONMOYER.
WHEEL TIRE.
No. 404,692. Patented June 4, 1889.
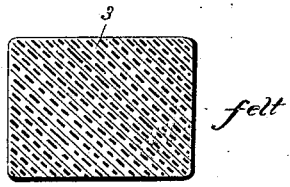
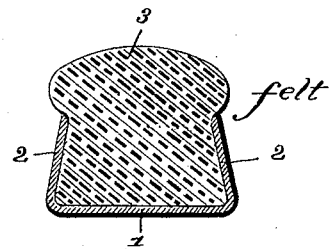
Witnesses
Inventor
R. W. Donmoyer
By his Attorney

UNITED STATES PATENT OFFICE.

RUDOLPH W. DONMOYER, OF SOUTH BEND, INDIANA.

WHEEL-TIRE.

SPECIFICATION forming part of Letters Patent No. 404,692, dated June 4, 1889.

Application filed March 14, 1889. Serial No. 303,205. (No model.)

*To all whom it may concern:*

Be it known that I, RUDOLPH W. DONMOYER, a citizen of the United States, residing at South Bend, in the county of St. Joseph and State of Indiana, have invented certain new and useful Improvements in Wheel-Tires, of which the following is a specification, reference being had therein to the accompanying drawings, in which—

Figure 1 represents a transverse sectional view of the wheel rim and tire before securing them together, and Fig 2 a view of the parts put together.

The object of the invention is to provide a wheel-tire for bicycles, velocipedes, and other vehicles which will possess the desirable qualities of durability and toughness, and at the same time be sufficiently compressible and elastic to render it perfectly easy and noiseless while in use, as will be more fully hereinafter specified.

In the drawings annexed the numeral 1 designates a metallic rim or felly of a wheel to which is attached the felt tire or tread 3. The felt tire 3 is preferably rectangular in cross-section, and is clamped to the rim by bending up and turning in the edges of the latter, the flanges 2 2 thus formed being slightly pressed into the felt upon its opposite sides.

It is evident that I may, without departing from the spirit of my invention, first form the dovetail groove in the periphery of the rim and then compress the felt and insert it in the groove, instead of the foregoing method.

A tire of felt or analogous material is extremely durable, and at the same time possesses the requisite amount of elasticity.

I am aware that it is not new to provide wheels with tires of rawhide, rope, rubber, paper-pulp, &c., and also that it is not new to provide rollers with a surface of rubber and felt, and therefore do not claim such as my invention.

Having thus fully described my invention, what I desire to procure by Letters Patent is—

A wheel rim or felly provided with a tire of felt, as and for the purposes set forth.

In testimony whereof I affix my signature in presence of two witnesses.

RUDOLPH W. DONMOYER.

Witnesses:
W. G. CROBILL,
C. P. BADET.